United States Patent [19]
Chang

[11] Patent Number: 5,833,183
[45] Date of Patent: Nov. 10, 1998

[54] ADJUSTABLE SUPPORT STRUCTURE FOR LIQUID CRYSTAL DISPLAY

[75] Inventor: Chih-Ching Chang, Taipei, Taiwan

[73] Assignee: Compal Electronics, Inc., Taipei, Taiwan

[21] Appl. No.: 819,056

[22] Filed: Mar. 18, 1997

[51] Int. Cl.$^6$ .................................................. F16M 11/00
[52] U.S. Cl. .................... 248/176.1; 248/371; 248/176.3
[58] Field of Search ................. 248/176.3, 511, 248/371, 398, 157, 188.2, 188.4, 188.5, 176.1

[56] References Cited

U.S. PATENT DOCUMENTS

| | | | |
|---|---|---|---|
| 686,159 | 11/1901 | Sprague | 248/211 |
| 2,274,794 | 3/1942 | Kitchen | 248/352 |
| 2,676,486 | 4/1954 | Lazan | 73/100 |
| 3,137,472 | 6/1964 | Louton, Jr. et al. | 248/371 |
| 3,159,366 | 12/1964 | Knight | 248/42 |
| 3,480,247 | 11/1969 | Waner | 248/355 |
| 3,958,786 | 5/1976 | Mann | 248/176 |
| 5,622,348 | 4/1997 | Stechly | 248/371 |

*Primary Examiner*—Ramon O. Ramirez
*Assistant Examiner*—Kimberly Wood
*Attorney, Agent, or Firm*—Pro-Techtor International Services

[57] ABSTRACT

An adjustable support structure for liquid crystal display, including a base seat, a rotary support and a telescopic retaining rod. One end of the rotary support is pivotally disposed on the base seat, while the other end thereof is disposed with a holding seat in which the display is located. One end of the retaining rod is pivotally disposed on the base seat, while the other end thereof is screwed with an adjustment thread rod. The free end of the thread rod upward extends to abut against and rotatably support the rotary support. By means of changing the screwing length of the thread rod in the retaining rod, different combined lengths of the retaining rod and the thread rod are created to push and support the rotary support by different inclination angles, so that the liquid crystal display held in the holding seat can be securely located and observed at different sight angles.

2 Claims, 2 Drawing Sheets

ADJUSTABLE SUPPORT STRUCTURE FOR LIQUID CRYSTAL DISPLAY

BACKGROUND OF THE INVENTION

The present invention relates to an adjustable support structure for liquid crystal display, including a base seat, a rotary support pivotally disposed on the base seat for holding and supporting the display and a telescopic retaining rod pivotally disposed on the base seat. The length of the retaining is changeable to adjustably push and support the rotary support by different inclination angles, so that the liquid crystal display held in the holding seat can be securely located and observed at different sight angles.

A conventional support structure for liquid crystal display includes a base seat and a support member pivotally disposed on the base seat for holding and supporting the display. By means of pivoting the support member, the display can be adjustably positioned and observed by different angles and heights. In such structure, a complicated arrangement is used to fasten the pivot shaft between the support member and the base seat so as to locate the support member at different angles. In use, some shortcomings exist in such structure as follows:

1. The pivot shaft connecting the support member and the base seat is always in a tightened state so that when changing the angle of the display, a great strength is, needed to shift and pivot the support member.
2. After a long period of use, the pivot shaft is subject to abrasion. This will lead to insufficient fastening force for the support member. Therefore, the display is apt to loosen or slip from its true position.
3. The fastening structure for the pivot shaft between the support member and the base seat includes many accessory elements and the pivot shaft often needs to be further processed. This leads to high manufacturing cost, while achieving unreliable fastening effect.

SUMMARY OF THE INVENTION

It is a primary object of the present invention to provide an adjustable support structure for liquid crystal display, including a base seat, a rotary support pivotally disposed on the base seat for holding and supporting the display and a telescopic retaining rod pivotally disposed on the base seat. A free end of the retaining rod inclinedly extends to rotatably abut against and support the rotary support. The length of the retaining rod is changeable to adjustably push and support the rotary support by different inclination angles, so that the liquid crystal display held in the holding seat can be securely located and observed at different sight angles.

It is a further object of the present invention to provide the above support structure in which an adjustment thread rod is screwed in the retaining rod, whereby by means of changing the screwing length of the thread rod in the retaining rod, different combined lengths of the retaining rod and the thread rod are achieved to push and support the rotary support by different inclination angles. With the screwing connection relationship, the thread rod is prevented from loosening or slipping relative to the retaining rod. Therefore, after changed, the combined length of the thread rod and the retaining rod can be hardly undesirably changed so that the display can be reliably located at an optimal angle.

It is still a further object of the present invention to provide the above support structure which has simple components and can be easily manufactured at low cost and conveniently operated.

The present invention can be best understood through the following description and accompanying drawings, wherein:

DETAILED DESCRIPTION OF THE PREFERRED EMBODIMENT

Figure 1:
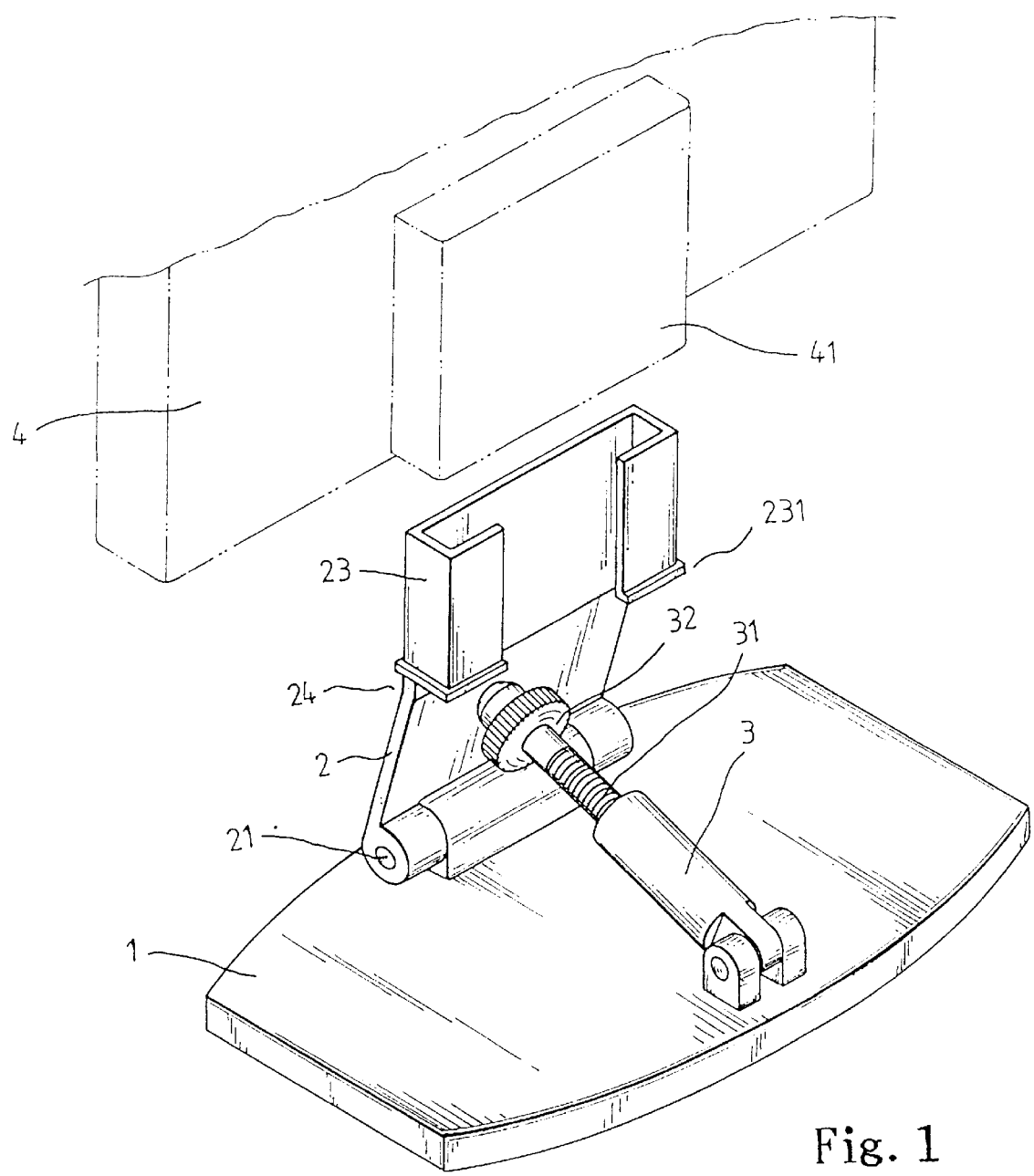
FIG. 1 is a perspective assembled view of the present invention.

Please refer to FIG. 1. The Present invention mainly includes a base seat 1, a rotary support, 2 and a telescopic retaining rod 3. One end of the rotary support 2 is pivotally disposed on the base seat 1 by a pivot shaft 21. The middle section of the rotary support 2 is disposed with a locating hole 22. A holding seat 23 is disposed at the top end of the rotary support 2 and a stopper board 231 is disposed on the bottom side of the holding seat 23. The fitting section 41 of a liquid crystal display 4 is fitted and located in the holding seat 23. One end of the retaining rod 3 is pivotally disposed on the base seat 1, while the other end thereof is screwed with an adjustment thread rod 31. A rotary wheel 32 is disposed at the middle section of the thread rod 31. A locking buckle 33 is disposed at the free end of the thread rod 31, whereby after the thread rod 31 is passed through the locating hole 22 of the rotary support 2, the locking buckle 33 serves to rotatably lock the thread rod 31 with the rotary support 2.

Figure 3:
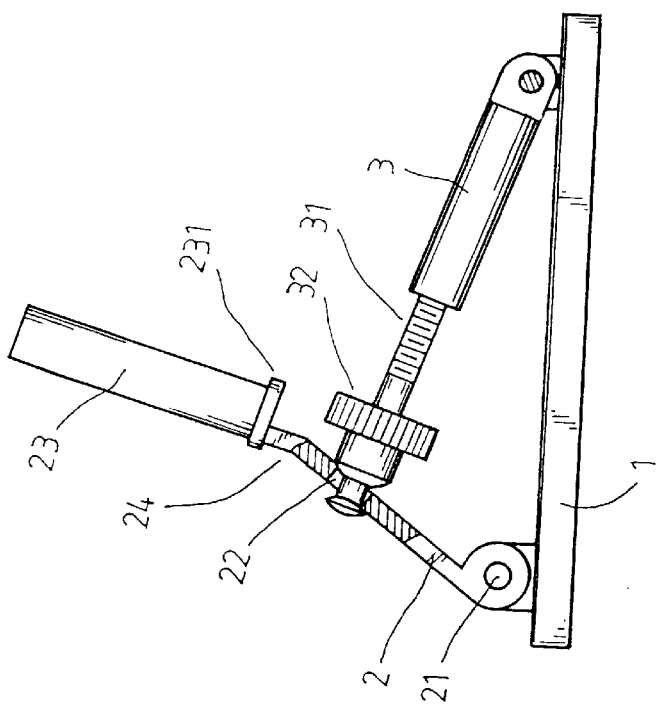
FIG. 3 is a view according to FIG. 2, in which the combined length of the thread rod and retaining rod is shortened to change the inclination angle of the rotary support of the present invention.
Figure 2:
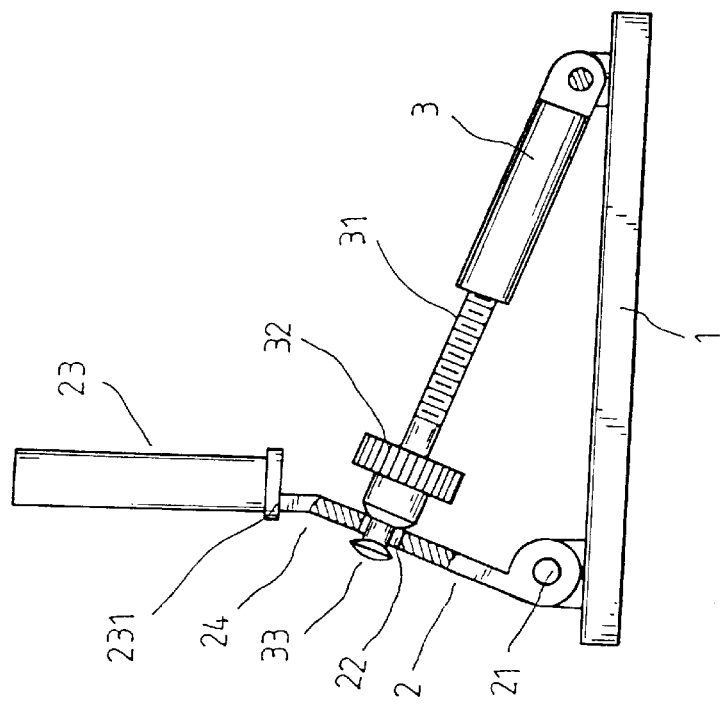
FIG. 2 is a partially sectional view showing the adjustment of the inclination angle of the rotary support of the present invention.

FIGS. 2 and 3 show the adjustment of angle of the rotary support, wherein by means of rotating the rotary wheel 32, the screwing length of the thread rod 31 in the retaining rod 3 is changed. With different combined lengths of the retaining rod 3 and the thread rod 31 extending through the locating hole 22 of the rotary support 2, the rotary support 2 is pushed by different inclination angles. Therefore, the liquid crystal display 4 held in the holding seat 23 can be located and observed at different sight angles for the user to select an optimal observation height.

In order to avoid excessively large inclination angle of the display 4, a bent section 24 is formed on upper side of the locating hole 22 of the rotary support 2, whereby the display 4 can be optimally and securely observed within a certain range of angle.

It should be noted that the above description and accompanying drawings are only used to illustrate one embodiments of the present invention, not intended to limit the scope thereof. Any modification of the embodiment should fall with in the scope of the present, invention.

What is claimed:

1. An adjustable support structure for liquid crystal display comprising:
    a base seat,
    a rotary support,
    a holding seat, and
    a telescoping retaining rod; wherein
        a first end of said rotary support is pivotally connected to said base seat, a second end of said rotary support is connected to said holding seat in which the liquid crystal display is adapted to be disposed, and a middle section of said rotary support includes a locating hole, and a first end of said retaining rod is pivotally connected to said base seat, and a second end of said retaining rod is provided with a threaded adjustment rod, a free end of said adjustment rod extends through said locating hole of said rotary support and abuts said rotary support, said free end of said adjustment rod includes a locking buckle, said locking buckle locks said adjustment rod in a rotatable position on said rotary support; such that by means of adjusting a length of said adjustment rod on said retaining rod, differing overall lengths of said retaining rod and said adjustment rod are provided to support said rotary support at varying inclination angles so that the liquid crystal display adapted to be held in said holding seat can be positioned and observed at different viewing angles.

2. An adjustable support structure for liquid crystal display comprising:

a base seat, a rotary support, a holding seat, and a telescoping retaining rod; wherein a first end of said rotary support is pivotally connected to said base seat, a second end of said rotary support is connected to said holding seat in which the liquid crystal display is adapted to be disposed, and a middle section of said rotary support includes a locating hole, and a first end of said retaining rod is pivotally connected to said base seat, and a second end of said retaining rod is provided with a threaded adjustment rod, a middle section of said adjustment rod includes a rotary wheel, and a free end of said adjustment rod extends through said locating hole of said rotary support and abuts said rotary support, said free end of said adjustment rod includes a locking buckle, said locking buckle locks said adjustment rod in a rotatable position on said rotary support; such that by means of adjusting a length of said adjustment rod on said retaining rod, differing overall lengths of said retaining rod and said adjustment rod are provided to support said rotary support at varying inclination angles so that the liquid crystal display adapted to be held in said holding seat can be positioned and observed at different viewing angles.

\* \* \* \* \*